Sept. 1, 1931.  K. SUNDBERG ET AL  1,820,953
METHOD AND APPARATUS FOR SUBSOIL INVESTIGATING
Filed Feb. 16, 1927
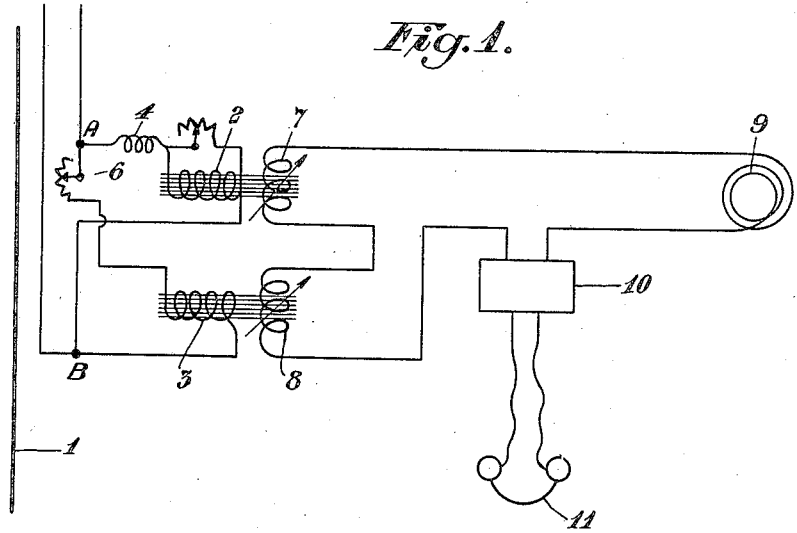
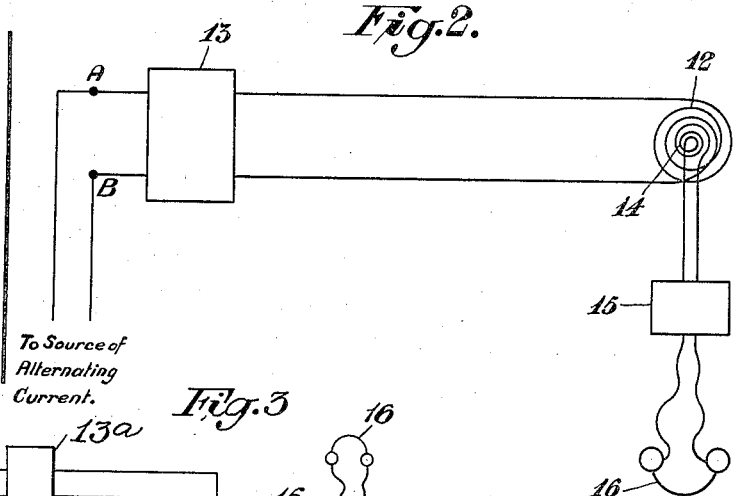
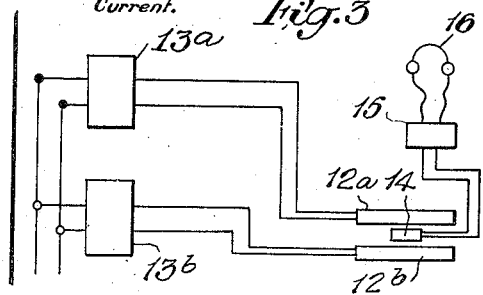
Inventors:
Karl Sundberg
Erik David Lindblom
by George Bayard Jones,
Attorney.

Patented Sept. 1, 1931

1,820,953

UNITED STATES PATENT OFFICE

KARL SUNDBERG AND ERIK DAVID LINDBLOM, OF STOCKHOLM, SWEDEN, ASSIGNORS TO AKTIEBOLAGET ELEKTRISK MALMLETNING, OF STOCKHOLM, SWEDEN, A COMPANY OF SWEDEN

METHOD AND APPARATUS FOR SUBSOIL INVESTIGATING

Application filed February 16, 1927, Serial No. 168,527, and in Sweden May 26, 1926.

The present invention relates to a method of discovering and determining the position, configuration, and nature of ores, solutions of salts, or other bodies by ascertaining and investigating those disturbances which such bodies produce in an electromagnetic field, and also to an apparatus for carrying out this method.

A majority of the ore prospecting methods which have heretofore been proposed, are electromagnetic, i. e. they are based on the principle that the location of the ore, or the like, is determined through those disturbances which it produces in an electromagnetic field generated in the ground. The different methods of this class as hitherto proposed, differ from one another firstly as regards the generation of the original field—the primary field, and secondly as regards the manner and means for investigating the disturbances—the secondary field—produced by the ore, or the like. Within the latter group methods have been proposed which involve the measuring of the direction and strength of the electromagnetic field, or of the proportion between its strength at two points. A measuring of the strength alone, or of the proportion between the strengths of the electromagnetic field at two points, is not always sufficient, however, for a complete determination and investigation of the secondary field, since this is phase-displaced in relation to the primary field. In the following table the measured disturbance in relation to the primary field has been calculated on the assumption that the strength of the secondary field amounts to 20 per cent of that of the primary field and that its phase angle $\phi$ varies from 180° to 90°:

| Phase angle $\phi$ | 180° | 150° | 135° | 120° | 95.75° | 90° |
|---|---|---|---|---|---|---|
| Strength of resultant field in proportion to strength of primary field | 0.80 | 0.83 | 0.87 | 0.92 | 1.00 | 1.02 |
| Disturbance measured in proportion to primary field | 0.20 | 0.17 | 0.13 | 0.08 | 0.— | -0.02 |

This table clearly shows that the magnitude of the disturbance or indication is dependent to a high degree upon the phase-displacement between the primary field and the secondary field. Since most frequently the strength of the secondary field is considerably less than what has been assumed here above, owing to which the magnitude of the disturbance is still further reduced, it is easily understood that by determining only the field strength, or the proportion between the strengths of the field at two points, without simultaneous determination of the phase, a disturbance may easily avoid the attention of the person making the observations. Only by determining the strength as well as the phase of the electromagnetic field it becomes possible to ascertain the disturbance independently of the phase of the secondary field. By such complete investigation of the electromagnetic field it also becomes possible to obtain an idea of the nature of the disturbing body, for instance as regards its electrical and magnetical properties, and a more accurate knowledge of its configuration.

In accordance herewith the present improved method consists principally in that the electromagnetic field at different points and in any desired directions is determined as regards strength as well as phase by compensating or equalizing said field, or potential or current induced thereby, by means of an auxiliary field adjustable as regards strength and phase, or divided into mutually phase-displaced adjustable components, or by means of one or more adjustable potentials or currents induced by a constant or adjustable auxiliary field or by components of such field, respectively.

For carrying out this method an apparatus may be used which consists of a combination of devices known per se which are so arranged that, for the purpose of determining the strength and phase of an unknown electromagnetic field, said devices are capable of producing an auxiliary field adjustable as regards strength and phase, or divided into mutually phase-displaced adjustable components, or of producing adjustable potentials or currents induced by a constant or adjustable auxiliary field, or components thereof. The auxiliary field may be generated by, or form a portion of, the electromagnetic field.

In the accompanying drawings Figs. 1 and 2 illustrate diagrammatically two embodiments of an apparatus according to the invention. Fig. 3 illustrates a modification of the apparatus shown in Fig. 2. Referring to Fig. 1, 1 denotes a portion of a loop placed on the ground and through which an electric current is allowed to flow for the purpose of generating the desired primary field in the ground. The strength and phase of the resultant electromagnetic field are determined by means of auxiliary fields generated by two transformers through the primary windings 2 and 3 of which currents are conducted which are mutually phase-displaced 90°, for instance. For this purpose said primary windings are connected across two points A and B, which may be connected to a source of alternating current, not illustrated in the drawings, for instance a coil, in which an electromotive force is induced. This is the case at any point within the range of the generated primary field, the phase and strength of said induced electromotoric force being dependent upon the location and position of the coil within the resultant electromagnetic field. The primary winding 2 of the one transformer is connected across the points A and B in series with an inductive resistance 4 and in parallel with an ohmic resistance 5, the winding 3 being connected across the points A and B in series with an ohmic resistance 6. By this arrangement it becomes possible to cause the currents passing through the two primary windings and thus also the auxiliary fields generated by said currents to become phase-displaced relatively to each other through a certain determinable angle and to obtain a certain desired amplitude. The secondary windings 7 and 8, respectively, of the two transformers are made capable of turning in the auxiliary fields generated by the primary windings, and are connected in series with each other and with a coil 9, or several such coils, placed at an arbitrary point, which coil is adapted to be influenced by the resultant electromagnetic field at this point, and with an amplifier 10, which in its turn is connected to an indicator, for instance in the form of a telephone receiver 11. By turning the secondary windings 7 and 8 in a suitable manner in the auxiliary fields generated by the primary windings 2 and 3 it is possible to compensate the potential generated in the coil 9 by the resultant electromagnetic field by means of the potentials generated in the secondary windings 7 and 8 by the auxiliary fields, so that no sound will be heard in the telephone receiver 11, and by reading off the adjustment of the rotatable secondary windings it is possible to determine the electromagnetic field at the point where the coil 9 was temporarily placed, as regards strength as well as phase.

In order to compute these values, it is necessary to know the strength and phase of the auxiliary fields induced in the secondaries 7 and 8 which, in turn, are dependent upon the frequency and strength of the employed attending current source, as well as upon the individual settings of the secondaries 7 and 8. Assuming that frequency and strength of the attending current source remain constant; that the phase displacement between the two secondaries has been adjusted by means of the resistances 5 and 6 and inductance 4 to exactly 90 degrees, and that the auxiliary fields induced in the secondaries 7 and 8 are a linear function of the different settings $S_7$ and $S_8$— then the strength $H_9$ and phase $\phi_9$ of the electromagnetic field at the point where coil 9 was temporarily placed can be expressed by the equations—

$$H_9 = \sqrt{(K_7 S_7)^2 + (K_8 S_8)^2}$$

and $$\phi_9 = \phi_x - \phi_n$$

Where $K_7$, $K_8$ and $\phi_n$ are three constants dependent upon the frequency, strength and phase of the alternating current source, as well as the electrical dimensions of the compensating device 2, 3, 4, 5, 6, 7 and 8, while $\phi_x$ can be determined from the expression $$tg\ \phi_x = N\frac{S_8}{S_7}, \text{ where } N = \frac{K_8}{K_7}.$$

The first equation can then be written $$H_9 = K_7 \sqrt{S_7^2 + (NS_8)^2}$$

containing the unknown constants $K_7$ and $N$. These constants can be determined by superimposing upon coil 9 fields of known strength and zero phase. Such fields are easily obtained by sending the primary current 1 through a "normal" coil of known dimensions located at known distance from the exploring coil 9. The field strength due to the normal coil can be computed in gauss per ampere primary current.

Assuming that we find the settings $S_7'$, $S_8'$ and $S_7''$, $S_8''$ compensating the known field strengths $H'$ and $H''$, then we have the following relations for the three constants $N$, $k_7$ and $\phi_n$ $$N = \sqrt{\frac{(S_7'' H')^2 - (S_7' H'')^2}{(S_8' H'')^2 - (S_8'' H'')^2}}; K = \frac{H'}{\sqrt{S_7'^2 + (NS_8')^2}}$$

$$tg\ \phi_n = N\frac{S_8'}{S_7'}$$

After this graduation has once been made, it is evident that any field can then be measured and computed in gauss per ampere primary current and degree of phase displacement.

According to the embodiment illustrated in Fig. 2 the strength and phase of the electromagnetic field is determined by means of an auxiliary field capable of regulation which field is generated by a current adjustable as regards strength and phase and which is conducted through a coil 12 placed at an arbitrary point. For this purpose said coil is connected across the points A and B which are assumed, as in the first instance, to be connected to a source of alternating current, not illustrated in the drawings, through the intermediary of a regulation device 13 of suitable kind by means of which the current may be regulated as regards strength and phase. Inside the coil 12 a second coil 14 is placed which is connected through the intermediary of an amplifier 15 with the telephone receiver 16. By suitably adjusting the strength and phase of the current conducted through the coil 12 so that no sound is heard in the telephone receiver 16, it is also in this case possible to determine the strength and phase of the resultant electromagnetic field at the point where the coil 12 was temporarily placed.

The embodiments above described and illustrated in the drawings are only to be regarded as examples of the invention, and it will be understood that the same may be further modified in respect of their details in several ways without departing from the principle and scope of the invention. In the embodiment according to Fig. 1, for instance, the auxiliary fields may be made capable of adjustment, in which case the secondary windings of the transformers need not be movable. In the embodiment illustrated in Fig. 2 the auxiliary field may be divided into several adjustable and mutually phase-displaced auxiliary fields, in which case a corresponding number of coils should of course be used instead of one coil 12. This modification is illustrated in Fig. 3. From the embodiment shown in Fig. 2, according to which the auxiliary field is produced by means of one coil 12 supplied with current adjustable as regards both strength and phase, the arrangement shown in Fig. 3 differs merely in that two coinciding coils 12a and 12b are used, each supplied through a regulation device 13a and 13b, respectively, with current adjustable as regards strength, said currents having a certain mutual phase displacement. The resultant field composed of the fields of said two coils may thus be adjusted to compensate the electro-magnetic field.

We claim:

1. The method of discovering, and determining the position, configuration, and nature of ores, solutions of salts, or other bodies, which consists in producing an electromagnetic field, and determining said electromagnetic field at different points and in any desired directions as regards strength and phase by compensating said field by means of another field.

2. The method of discovering, and determining the position, configuration, and nature of ores, solutions of salts, or other bodies, which consists in producing an electromagnetic field, and determining said electromagnetic field at different points and in any desired directions as regards strength and phase by compensating said field by means of another field adjustable as regards strength and phase.

3. The method of discovering, and determining the position, configuration, and nature of ores, solutions of salts, or other bodies, which consists in producing an electromagnetic field, and determining said electromagnetic field at different points and in any desired directions as regards strength and phase by compensating said field by means of another field divided into mutually phase-displaced adjustable components.

4. The method of discovering, and determining the position, configuration, and nature of ores, solutions of salts, or other bodies, which consists in producing an electromagnetic field, and determining said electromagnetic field at different points and in any desired directions as regards strength and phase by compensating the inductive effect produced by said field in the surface of the ground on detector means by means of an inductive effect produced on said detector means by another field.

5. The method of discovering, and determining the position, configuration, and nature of ores, solutions of salts, or other bodies, which consists in producing an electromagnetic field, and determining said electromagnetic field at different points and in any desired directions as regards strength and phase by compensating potential and current induced by said field in the surface of the ground by means of an adjustable potential and current induced by another field.

6. The method of discovering, and determining the position, configuration, and nature of ores, solutions of salts, or other bodies, which consists in producing an electromagnetic field, and determining said electromagnetic field at different points and in any desired directions as regards strength and phase by compensating potential and current induced by said field by means of potential and current induced by another field divided into mutually phase-displaced adjustable components.

7. The method of discovering, and determining the position, configuration, and nature of ores, solutions of salts, or other bodies, which consists in producing an electromagnetic field, and determining said electromagnetic field at different points and in any desired directions as regards strength and phase by compensating said field by means of another field induced by said electromagnetic field.

8. Apparatus for discovering, and determining the position, configuration, and nature of ores, solutions of salts, or other bodies, by determining an electromagnetic field at different points and in any desired directions as regards strength as well as phase, including means for producing an electromagnetic field, and means for producing another field for compensating such electromagnetic field.

9. Apparatus for discovering, and determining the position, configuration, and nature of ores, solutions of salts, or other bodies, by determining an electromagnetic field at different points and in any desired directions as regards strength as well as phase, including means for producing an electromagnetic field, and means for producing an auxiliary field for compensating such electromagnetic field, said means comprising two transformers, each having a primary winding and a secondary winding, means for supplying phase-displaced currents to the primary windings of said transformers for generating auxiliary fields, said secondary windings being capable of rotation in said auxiliary fields, an indicator, and at least one coil adapted to be placed in said electromagnetic field, said secondary windings being connected to each other and to said indicator and said coil.

10. Apparatus for discovering, and determining the position, configuration, and nature of ores, solutions of salts, or other bodies, by determining an electromagnetic field at different points and in any desired directions as regards strength as well as phase, including means for producing an electromagnetic field, and means for producing an auxiliary field for compensating such electromagnetic field, said means comprising a coil adapted to be placed in the electromagnetic field, means for generating a current adjustable as regards strength and phase in said coil, a second coil adapted to be placed inside said first named coil, and an indicator connected to said second coil.

KARL SUNDBERG.
ERIK DAVID LINDBLOM.